Figure 1:
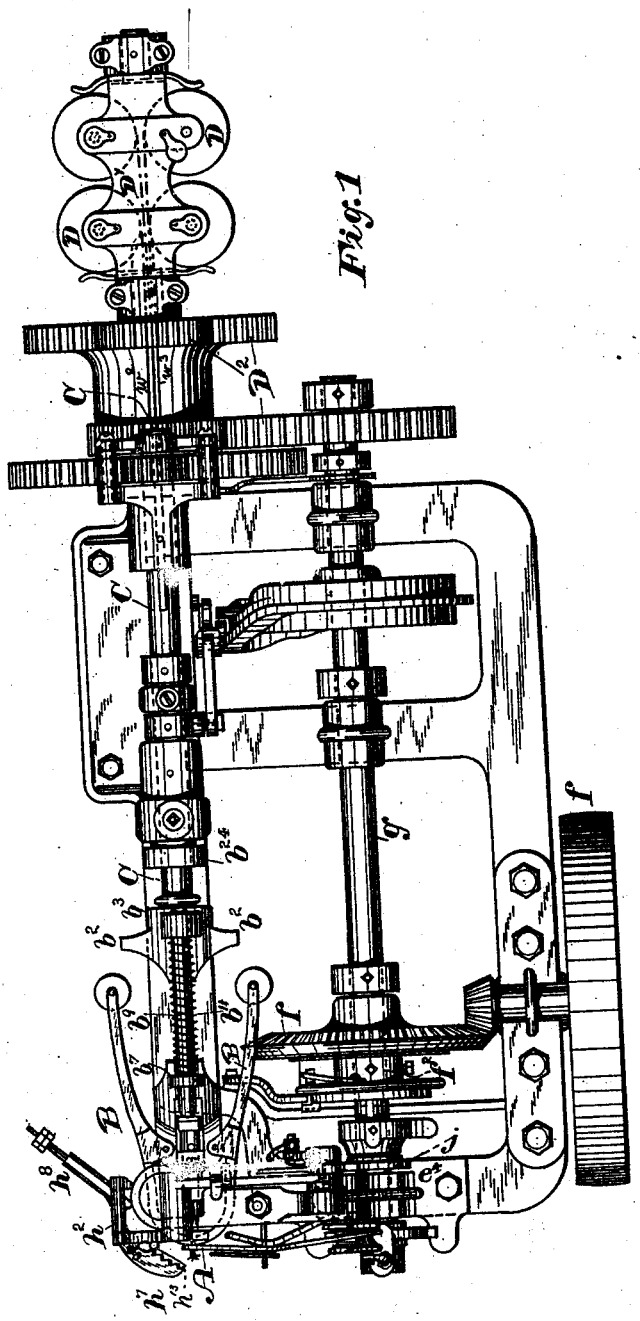

(No Model.) 8 Sheets—Sheet 1.

B. ADRIANCE.
WIRING CORKS IN BOTTLES.

No. 364,202. Patented June 7, 1887.

WITNESSES:

INVENTOR
Benjamin Adriance
BY Campbell ATT'YS.

(No Model.) 8 Sheets—Sheet 3.

B. ADRIANCE.
WIRING CORKS IN BOTTLES.

No. 364,202. Patented June 7, 1887.

WITNESSES:
J. H. Bartine
Wm. E. Blewett

INVENTOR
Benjamin Adriance
BY Campbell & Co. ATT'YS.

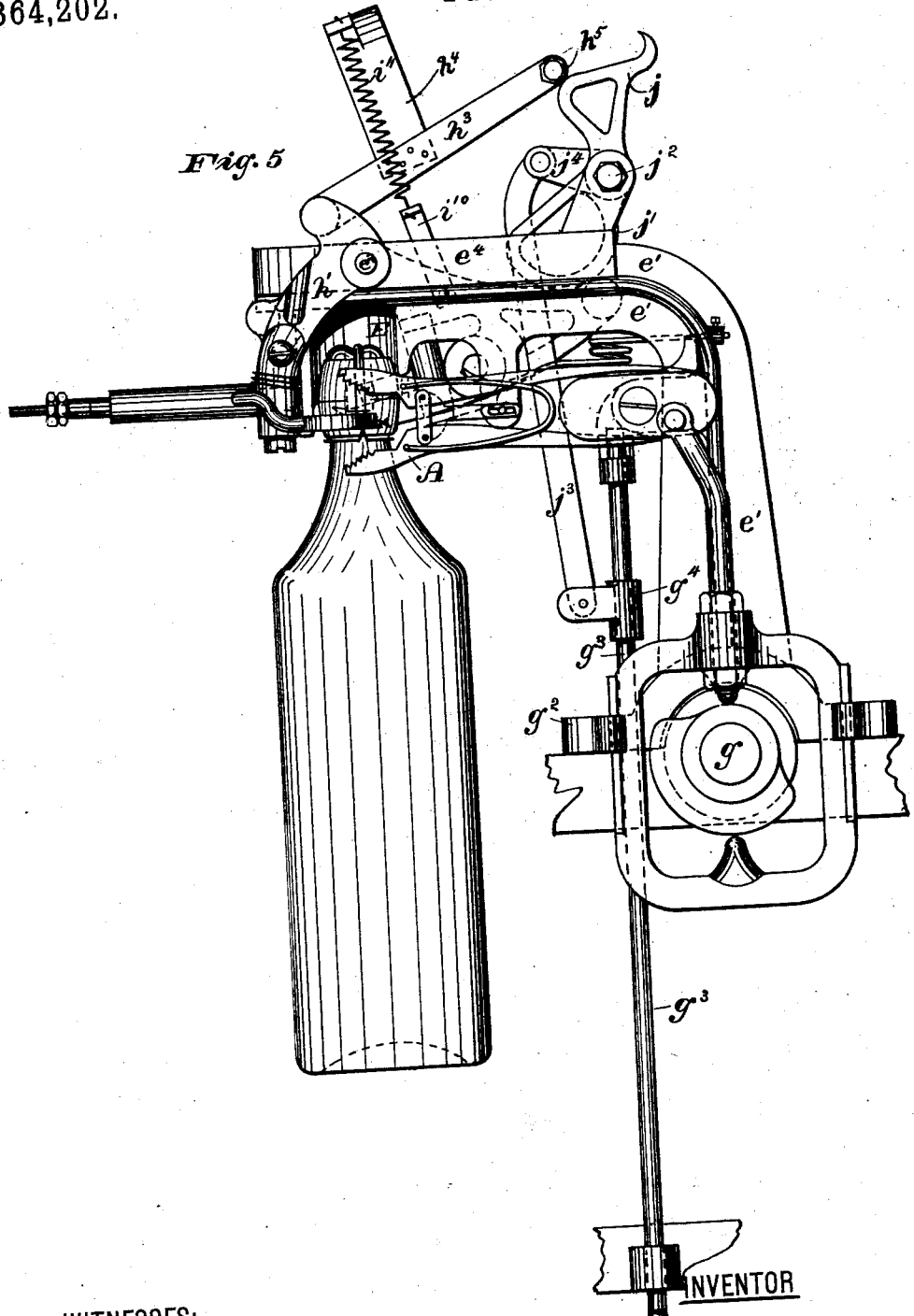

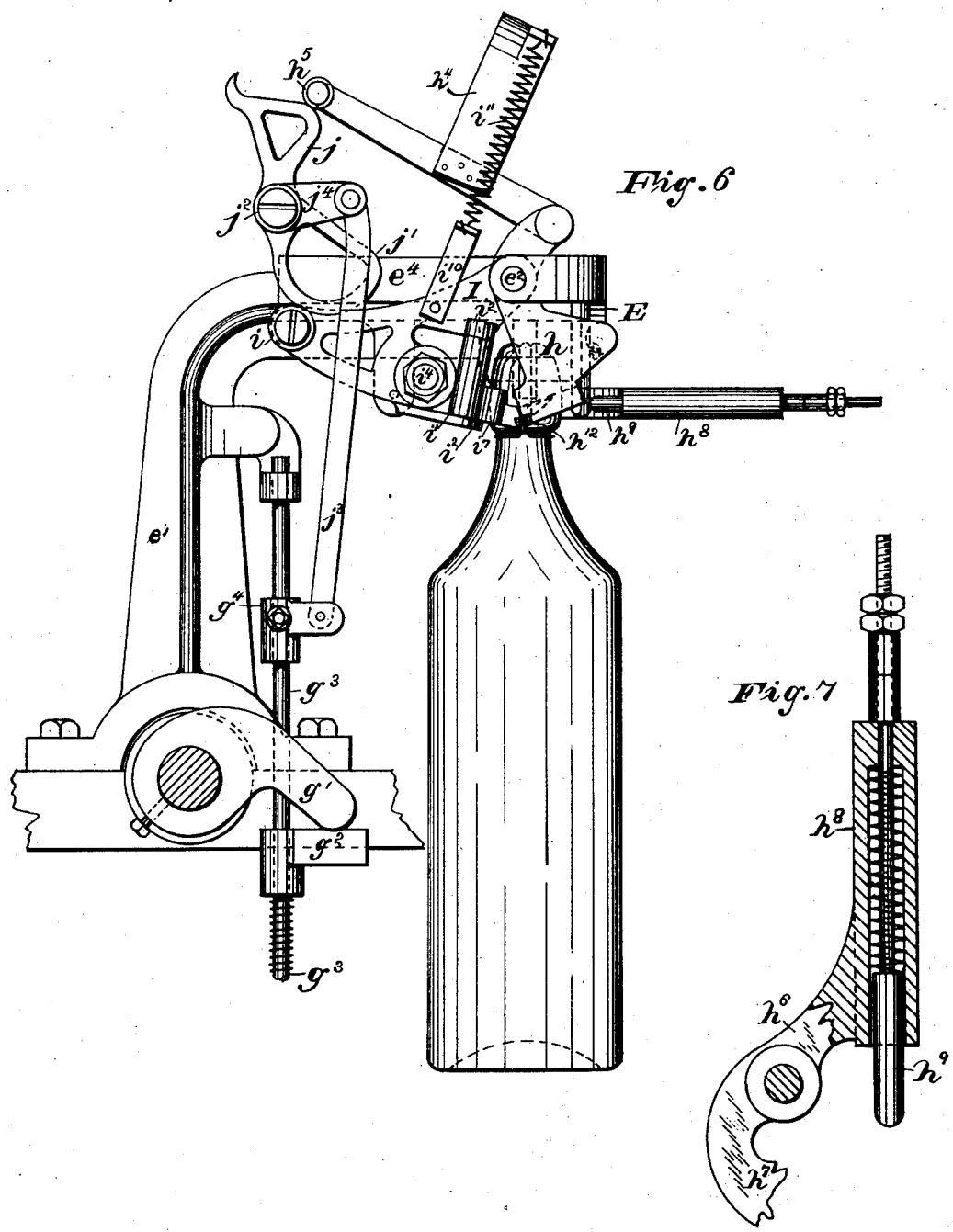

(No Model.) 8 Sheets—Sheet 6.
B. ADRIANCE.
WIRING CORKS IN BOTTLES.
No. 364,202. Patented June 7, 1887.
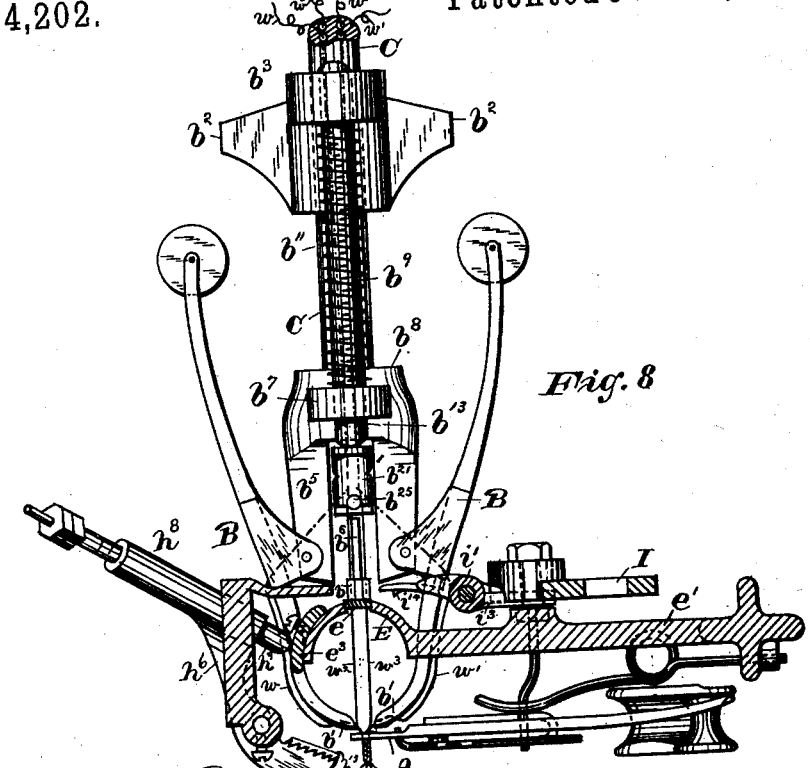
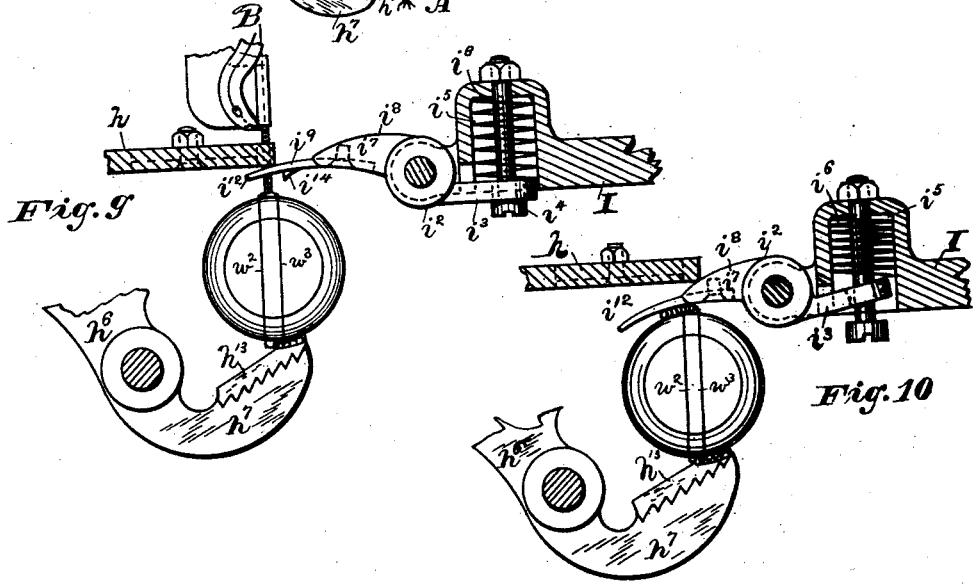
WITNESSES:
INVENTOR
Benjamin Adriance
BY Campbell & Co ATT'YS.

(No Model.)
B. ADRIANCE.
WIRING CORKS IN BOTTLES.
No. 364,202. Patented June 7, 1887.
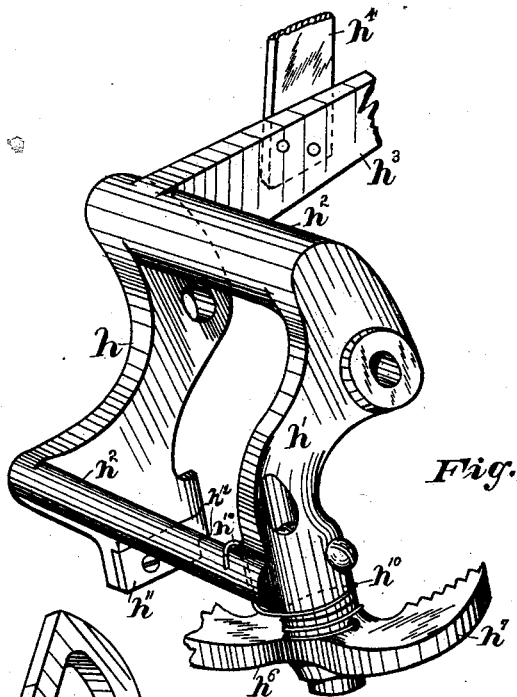
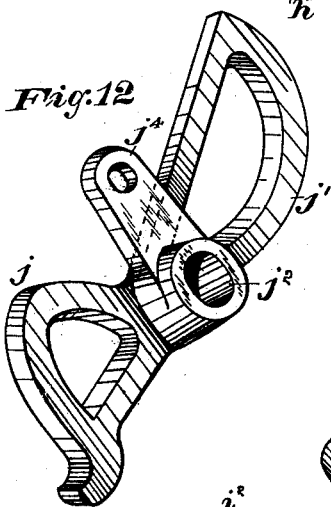
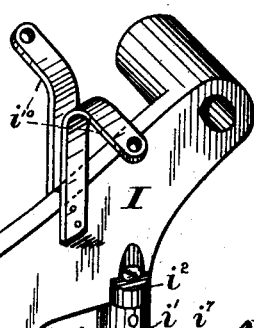
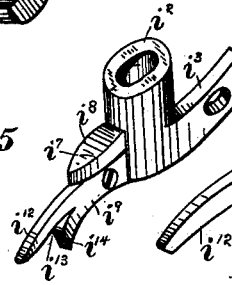
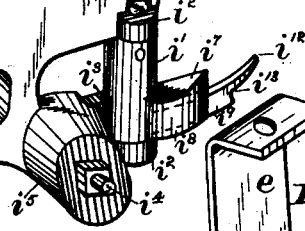
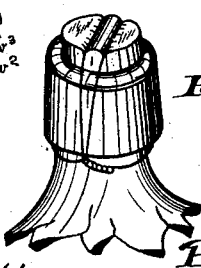
WITNESSES:
INVENTOR
Benjamin Adriance
BY Campbell & ATT'YS.

(No Model.) 8 Sheets—Sheet 8.
B. ADRIANCE.
WIRING CORKS IN BOTTLES.
No. 364,202. Patented June 7, 1887.
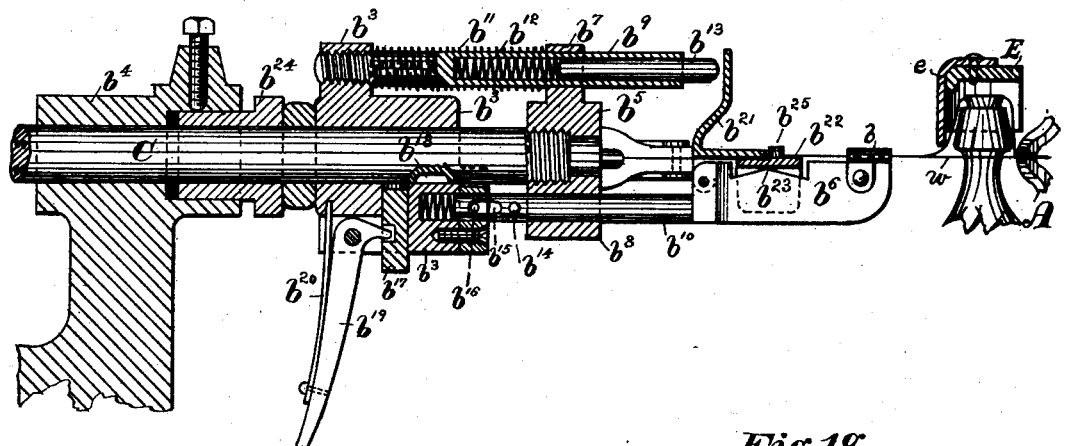
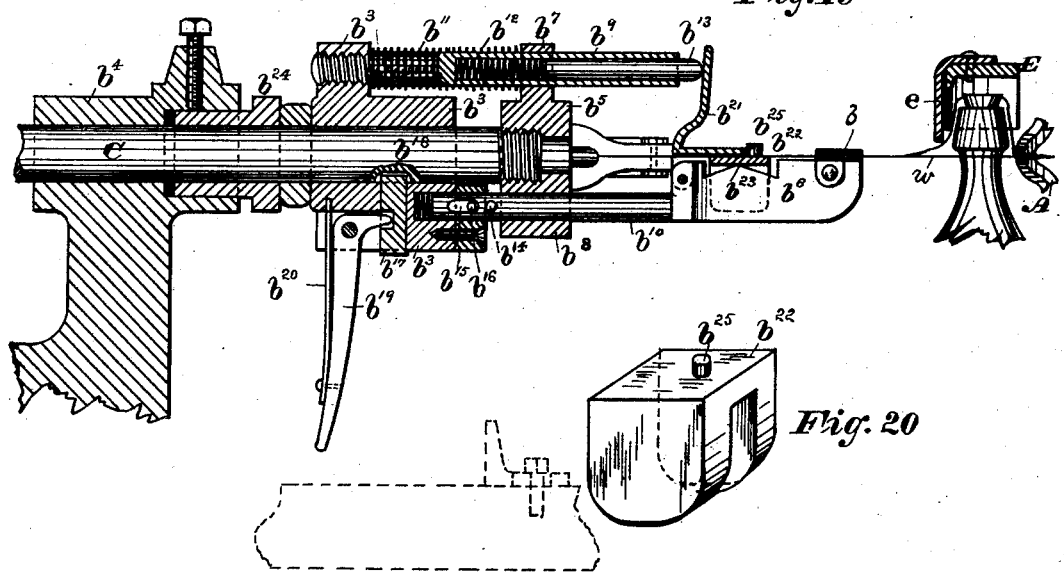
WITNESSES: INVENTOR
Benjamin Adriance
BY Campbell & Co. ATT'YS.

UNITED STATES PATENT OFFICE.

BENJAMIN ADRIANCE, OF BROOKLYN, ASSIGNOR TO WILLIAM C. VAN VLIET, OF NEW YORK, N. Y.

WIRING CORKS IN BOTTLES.

SPECIFICATION forming part of Letters Patent No. 364,202, dated June 7, 1887.

Application filed December 21, 1886. Serial No. 222,153. (No model.)

*To all whom it may concern:*

Be it known that I, BENJAMIN ADRIANCE, a citizen of the United States, residing at Brooklyn, in the county of Kings and State of New York, have invented certain new and useful Improvements in Machines for Wiring Corks in Bottles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

In Patents No. 352,168, granted November 9, 1886, to William C. Van Vliet, and Nos. 295,735 and 318,955, granted March 25, 1884, and June 2, 1885, respectively, to Oramill C. Carpenter, all of which are for improvements in machines for wiring corks in bottles, are illustrated several forms of mechanism designed to secure the corks in bottles by passing four separate strands or wires over the cork and around the neck of the bottle, two of said wires passing up over the top of the cork and one on each side of the neck, the ends of said wires being twisted together on opposite sides of the neck of the bottle. In each of said machines the mechanism is adapted to draw the binding-wires around the neck of the bottles and over the cork, to twist the ends of said strands on opposite sides of the neck, and to sever the binding-wires from the continuous length of wire; but with the exception of the machine shown in Patent No. 352,168, of William C. Van Vliet, the said twisted ends of the binding-wires remain projecting straight out from the sides of the neck of the bottle after the bottle is removed from the machine, and must be subsequently pressed close to the neck of the bottle by hand. The mechanism illustrated in said Patent No. 352,168 is adapted to press said projecting twisted ends down close to the neck of the bottle; but the bending-down mechanism is separate from and entirely independent of the wiring mechanism, and after the binding-wires have been drawn over and around the head of the bottle, twisted, and cut off by the wiring mechanism, the bottle is then removed from said mechanism and is inserted into the bending-down mechanism, by which the final operation is performed. This necessarily involves two separate and distinct operations, requires considerable handling of the bottle, and thereby limits the working capacity of the operator and the machine, and also increases the complexity of the mechanism and its cost of construction.

The primary purpose of the invention herein specified is to avoid this double handling of the bottle, by so constructing a machine that all of the necessary operations of wiring the bottle, severing the wires, and bending down the projecting twisted ends are performed consecutively without removing the bottle from the machine until all of the operations are finished and the bottle is completely wired. In addition to this principal object, the invention is further designed to provide a device for regulating the tension of the wires, and also a simple and effective contrivance whereby the overdrawn wires are pressed down close to the neck of the bottle and near the encircling wires on the side of the bottle next to the rotating and sliding spindle before being twisted.

The form of construction selected to embody the invention in an operative machine is illustrated in the accompanying eight sheets of drawings, which show, in connection with certain old features illustrated in the patents hereinbefore referred to, the novel features of my invention, said common portions of the mechanism being included in the drawings to more clearly indicate the relation of the novel portions thereto.

Figure 2:
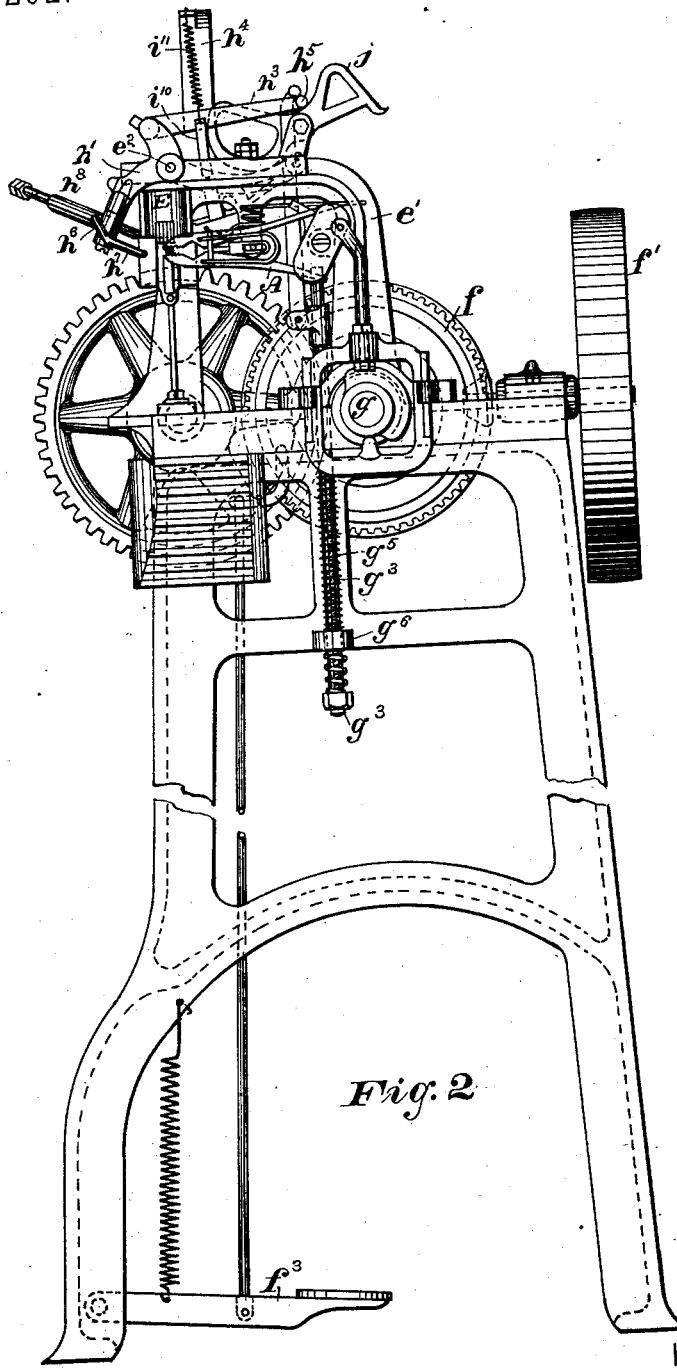
Figure 3:
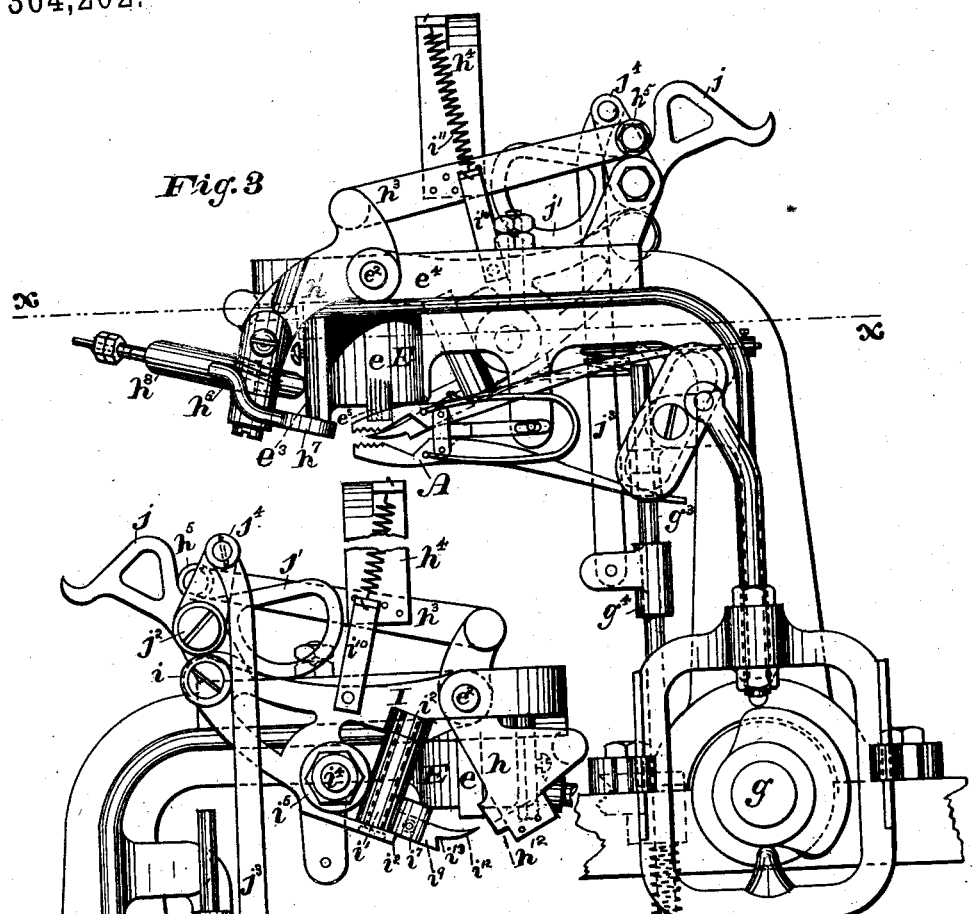
Figure 4:
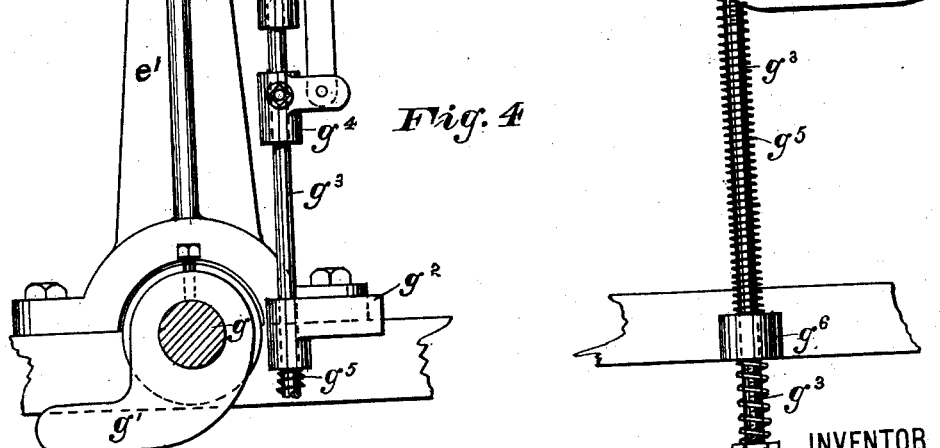

In said drawings, Figure 1 is a plan of a wiring-machine in which is shown the mechanism selected to illustrate the invention. Fig. 2 is a front elevation of the said machine. Fig. 3 is a front elevation of the socket which receives the head of the bottle and the bending-down devices, the holding-nippers, &c., arranged therearound in that position of the mechanism in which the completely-wired bottle has been removed from the socket and the twisted ends of the wires have been brought forward and inserted between the nippers, which are about to close thereon, said twisted ends and the mechanism that holds and projects the same being omitted from this view, the same being shown in Fig. 2. Fig. 4 is an elevation of the rear of said socket and surrounding mechanism in the position described in Fig. 3. Figs. 5 and 6 are respectively front and rear elevations of the same mechanism shown in Figs. 3 and 4, in a position which immediately precedes that shown in said last-named figures, in which position the bending-down mechanism is pressing one of the projecting twisted ends close to the front side of the neck of the bottle, while at the same time the cutting mechanism is severing the twisted strands on the opposite side of the neck of the bottle, as shown in Fig. 6. Fig. 7, Sheet 5, is a view, partly in section, of the mechanism for regulating the pressure of the pivoted bending-down lever. Fig. 8 is a sectional view taken through the line $x$, Fig. 3, showing the position of the wire drawing and twisting device, the nippers, &c., ready to permit the insertion of the head of the bottle. Fig. 9 is an enlarged detail view, in plan and section, illustrating the position of the bending-down lever when pressing down the twisted ends on one side of the bottle while the cutting mechanism is severing the twisted strands, and Fig. 10 is a similar view of the same devices after the twisted strands have been severed and the bending-down devices on the same side of the bottle are performing their work. On Sheet 7, Fig. 11 is a perspective view of the main portion of a rocking frame to which one of the bending-down devices is pivoted, the larger portion of said bending-down device being broken away in said view. Fig. 12 is a similar view of a double-acting cam. Fig. 13 is also a perspective view, showing a pivoted swinging frame, to which is attached the severing mechanism and the bending-down mechanism on one side of the bottle. Fig. 14 is a perspective view of a corked and wired bottle; Fig. 15, a perspective view of the pivoted knife-holding lever; Fig. 16, a similar view of the wire-depressing plate; and Fig. 17, an enlarged view, in perspective, of the end of the cutter and a portion of the binding-wires, showing the manner of bending down one of the projecting twisted ends. On Sheet 8, Fig. 18 is a longitudinal section of the bottle-socket, &c., and the mechanism moving on the end of and turning with the tubular shaft, and also the tension devices in their relaxed position. Fig. 19 is a similar view of the same devices, but in a position in which the tension is being exerted; and Fig. 20 is a perspective view of the saddle.

Similar letters of reference are employed to indicate corresponding parts in each of said above-described views.

The construction and operation of those wiring-machines to which my invention relates, which are described in the patents hereinbefore mentioned, will be herein briefly described, in order that a more complete understanding may be had of the relation of my improvements thereto and a clear line of separation drawn between what is old and what is new in the mechanism illustrated in the drawings.

In said illustrated mechanism, the old portions thereof, and to which I lay no claim, are the gripping-nippers A, which seize the twisted ends of the binding-wires, and the mechanism for operating the same; the reciprocally and rotatively moving twisting-pliers B, which cause the binding-wires to encircle the neck of the bottle, and the device for producing the proper movements thereof; the sliding and rotating tubular shaft C, to one end of which are attached the twisting-pliers, and the mechanism for operating the same, and which also, by means of the wire-guiding tubes therein, maintains the separation of said wires, and serves to direct the same from the spools D to and through the twisting-pliers and the overdrawn-wire-guiding tubes $b$, and the mechanism for causing the rotating and sliding motion of said shaft at the proper time.

The ends of the twisting-pliers are so shaped as to form an opening beneath the socket E, which receives the head of the bottle, the encircling wires $w$ and $w'$ passing around the outside of said pliers and through the perforated ends thereof to the nippers, and the overdrawn wires $w^2$ and $w^3$ extending diametrically across said opening from the tubular shaft through the guiding and separating tubes or nozzles $b$ to the nippers, as indicated in Fig. 8.

In the initial operation of the machine the binding-wires must be held or twisted by hand to enable the nippers to seize the same; but after the first wiring operation and each successive wiring a sufficient length of the twisted ends is left to enable the nippers to seize and hold the ends of the wires.

The operation of the machine in wiring a single bottle is as follows: The neck of the bottle is forcibly inserted up through the opening formed by the pliers into the socket carrying the wires $w^2$ and $w^3$, lying over the top of the cork, up therewith, and when the head of the bottle is in the position to permit the encircling wires $w$ and $w'$ to be drawn properly around the same, the bevel gear-wheel $f$, actuated by the pulley $f'$, turning loosely on the main shaft $g$, is caused to rotate said main shaft by means of the clutch mechanism $f^2$, which is under the control of the operator, through the foot-lever $f^3$, which in turn actuates the mechanism which causes the sliding movement of the shaft C. The result of this operation is, that the twisting-pliers are moved backward or away from the nippers, the jaws $b'$ opening around the neck of the bottle, and by means of the projecting lugs $b^2$ close together behind the neck of the bottle, thereby causing the wires $w$ and $w'$ to encircle the neck of the bottle, as indicated in Fig. 14. When the pliers have reached this position, which is the end of the sliding movement, a clutching device in the portion $b^3$ of the head now operates to throw said portion $b^3$ of the head, which, because of its normal loose position on the shaft C, permits said shaft to move backward therethrough into holding engagement with the said sliding tubular shaft C, which begins to rotate, carrying said head and the several parts connected therewith, thereby twisting the four binding-wires between the ends of the separating-tubes $b$ and the plate $e$ in the socket into a single strand. The distance between said tube $b$ and said plate $e$ is about twice the length of the projecting twisted ends, the said strand being severed at about the middle thereof, leaving a portion of the twisted wire still projecting from the plier-jaws and the tubes $b$. After the wires have been twisted a sufficient number of times the cutting mechanism operates to cut said twisted strand.

In the machines heretofore made, this last operation completes the wiring of the bottle by a series of successive operations without removing the bottle from the socket, the twisted ends projecting straight out from the neck of the bottle, the finishing operation of bending down the said ends being done by hand; or, when performed by mechanical means, said mechanism has been so arranged in relation to the wiring mechanism that the bottle must be withdrawn from the said wiring mechanism and inserted into separate bending-down devices, thus doing what my invention is designed to avoid—viz., the additional handling of the bottle.

In my improved machine the twisting and severing of the wires is not the last operation performed before the bottle is removed, but is followed by that operation which constitutes the prime feature of the invention—viz., the bending down of the twisted ends. The devices for accomplishing this result are arranged around and attached to the socket E in the front portion of the machine, said socket being formed in or secured to the end of a curved arm, $e'$, extending up from the frame of the machine, as indicated in Figs. 3 to 6, inclusive.

The device for bending down the projecting ends on the front side of the bottle, or the side next the nippers, consists of a rocking frame pivoted to the arm $e'$ at $e^2$, Figs. 3, 4, 5, and 6, a bolt extending through said frame, as indicated. Said frame consists of downwardly-projecting plates or portions $h$ $h'$, Fig. 11, which lie on opposite sides of the socket, as shown in Figs. 1, 3, and 4, and are connected by cross-bars $h^2$, an arm, $h^3$, projecting from the upper bar $h^2$, having a spring-supporting standard, $h^4$, extending upwardly therefrom, said arms being also provided with a roller, $h^5$, Figs. 3 and 5. That part of said rocking frame which acts directly to bend down the twisted end nearest the nippers is a lever, $h^6$, pivoted to the bottom of the side portion, $h'$, Fig. 11, consisting of the tooth end $h^7$, which engages the twisted end, and an elongated end, $h^8$. To regulate and adjust the pressure of said toothed end, to permit the same to meet different-sized bottles, suitable mechanism is provided, that shown in Fig. 7 consisting of a spring-actuated plunger, $h^9$, regulated by a nut on the threaded end arranged within the tubular end $h^8$, the end of said plunger bearing against a steel plate, $e^3$, on the socket, Figs. 3 and 8. The effect of this arrangement is, when the arm $h^3$ is raised by the action of certain other mechanism to be described hereinafter, and the lower portion of the rocking frame is thereby lowered, to cause the end of said plunger $h^9$ to strike the plate $e^3$, and by a further lowering of said lower portion the toothed end is thrown around toward the bottle in the socket, the bottle being held by the operator in such position that said toothed end presses against the projecting twisted end and bends the same down against the neck, as shown in Fig. 14. A spring, $h^{10}$, throws the toothed end away from the bottle and from between the jaws of the nippers when the rocking frame is released. On the inside of the bottom of the side $h$ of the rocking frame is a hardened plate or cutter, $h^{11}$, having the lower corner cut out, forming an angular recess, $h^{12}$, the function of which, as well as the plate itself, will be detailed hereinafter.

A projecting flange, $h^{13}$, Figs. 9 and 10, is provided on the serrated face of the bending-down lever $h^6$, which supports the projecting twisted ends of the wires in the bending-down operation, similar to that illustrated in Fig. 17, described hereinafter.

The mechanism for severing the twisted strands of wire and bending down the twisted ends projecting from the side of the bottle nearest the plier-head is arranged on the opposite side of the socket and curved arm, and is illustrated in Figs. 4 and 6 and in detail in Figs. 13 and 14, and consists of a swinging frame, I, pivoted at $e^2$ on the same bolt which acts as a pivotal point for the rocking frame, and projects away from said bolt in the same direction as the arm $h^3$, having a roller, $i$, on the extreme end thereof, as in Figs. 4 and 6.

To the lower parts of said frame I is pivoted that portion of said frame which directly severs the twisted wires and bends down the projecting end, which consists of a piece, $i'$, pivotally arranged between two bearing-plates, $i^2$, Fig. 13, said piece being provided on one side with a slotted arm, $i^3$, through which passes a bolt, $i^4$, Figs. 9 and 10. The said arm $i^3$ projects into a hollow portion, $i^5$, through which said bolt $i^4$ passes, and around said bolt, between the bottom or end of said hollow portion $i^5$ and the slotted arm, a spring, $i^6$, is arranged which presses said slotted arm outwardly, as will be understood by comparing Figs. 9 and 10.

From the opposite side of the tubular portion of the piece $i'$ an arm, $i^7$, projects, as indicated in Figs. 9, 10, 13, and 15, the outside $i^8$ of which is curved, and extending out beyond said arm and secured thereto is a cutter or knife, $i^9$, which is also curved to about the same degree as the side $i^8$, thereby forming a continuous curve. (Shown more especially in Figs. 9 and 10.) Rising from said swinging frame are spring-supporting strips $i^{10}$, between which and the standard $h^4$ on the arm $h^3$ are arranged springs $i^{11}$. For operating both of said frames a double-acting cam is employed, pivoted to the back of the curved arm $c'$, or to a plate, $c^4$, bolted thereto, said cam consisting of two curved portions, $j$ $j'$, on opposite sides of the pivotal point $j^2$ thereof, the upper portion thereof, $j$, engaging with the roller $h^5$ on the rocking frame, while the lower portion, $j'$, bears upon the roller $i$ on the swinging frame I, the engagement of said rollers $h^5$ and $i$ with said portions $j$ and $j'$ being maintained by the springs $i^{11}$, which tend to draw said rocking and swinging frames toward each other and still permit the necessary operation of each. The pivotal movement of said double-acting cam is transmitted from the main shaft through a cam, $g'$, which engages with a plate, $g^2$, on a reciprocally-moving rod, $g^3$, at stated intervals, and from an adjustable collar, $g^4$, secured on said rod $g^3$, through a pivoted connecting-rod, $j^3$, to the double-acting cam. The said connecting-rod is pivoted to an arm, $j'$. (Shown in Figs. 4 and 12.)

As indicated in Figs. 13, 15, and 17 more clearly, the knife $i^9$ is of peculiar form, having a long narrow projecting end, $i^{12}$, extending out from the main portion thereof, $i^9$, which is much broader than said narrow end, thereby forming a cutting angle, $i^{13}$, from the inside of which projects a wedge-like projection, $i^{14}$, which passes under the projecting twisted end after the twisted strand has been severed and supports the same, while said end is pressed down close to the bottle by the upper part of the knife, as in Figs. 10 and 17. The flange $h^{13}$ on the toothed or serrated end of the lever $h^6$ also serves the same purpose, as indicated in Figs. 9 and 10.

The mode of operation of the above-described devices for severing the twisted strand and bending down the projecting stubs is after the following manner: The bottle having been inserted in the socket, and the encircling and overdrawn wires properly adjusted around the head of the bottle by the operations previously described, then the twisting of the four wires begins, and during the continuance of this operation the rocking and swinging frames begin to move—the rocking frame to cause the bending-lever $h^6$ to perform its work, and also to lower the plate $h^{11}$ toward the twisted strand, which lies in the recess $h^{12}$ when the rocking frame has reached the extent of its movement, as shown in Fig. 6, and the swinging frame to throw the cutter down toward the twisting-wires, which severs the strand at or near the close of the twisting operation.

In cutting the strands, the wires lie in the recess $h^{12}$ of the plate $h^{11}$, as above stated, and are thereby held firmly when the knife strikes and severs the strand. At the same time the toothed end $h^7$ presses the projecting twisted end down close to the bottle and continues to press against the neck of the bottle during the cutting operation, acting thereby to hold the head of the bottle immovably in the socket, as in Figs. 9 and 10.

In cutting the twisted strand the end $i^{12}$ of the knife passes behind the plate $h^{11}$ before the cutting angle $i^{13}$ touches the wires, as shown in Fig. 9, and after the separation of the strand the knife continues its movement until the curved outside $i^8$ of the arm $i^7$ strikes the plate or cutter $h^{11}$, and as said plate and the side portion, $h$, to which it is secured are rigid, and the piece to which the knife is secured is movable, the knife is thrown in toward the neck of the bottle against the projecting twisted end of the severed wires, thereby pressing the same close to the neck of the bottle, and at the same time the slotted arm $i^3$ represses the spring $i^6$, as illustrated in Fig. 10.

By the time the severing and bending-down operations are completed, the cam $g'$, through which the motion of the main shaft is communicated to said severing and bending-down devices, as above described, has disengaged itself from the plate $g^2$, which, when released, flies upward under the upward force of the spring $g^5$, which is arranged around the rod $g^3$ between the plate $g^2$ and a fixed bearing, $g^6$, on the frame of the machine, as shown in Figs. 3 and 5. This upward movement of the rod $g^3$, and which also carries the connecting-rod $j^3$ upward with it, causes the return of the double-acting cam from the position shown in Figs. 5 and 6, which it assumes at the end of the severing and bending-down operations, to that shown in Figs. 3 and 4, which is the normal unoperated position of said mechanism, and thereby releases the rocking and pivoted frames and the parts attached thereto from that position which they have assumed in bending down the twisted ends of the binding-wires and allowing them to return to their unoperated position, so as not to obstruct the remaining operations of the machine. When this point in the operation of the machine is reached and the bending and severing devices have returned to their normal position, the bottle is withdrawn from the socket completely wired, with the twisted ends of the binding-wires pressed close to the neck of the bottle, substantially as indicated in Fig. 14.

Upon the removal of the wired bottle the return sliding movement of the spindle and attached parts begins and continues until the twisted ends of the wires which remain projecting from the ends of the pliers and guiding-tubes $b$ are brought forward and inserted between the jaws of the nippers, which close down upon the same, as indicated in Figs. 1, 2, and 8, and simultaneously therewith, by means of the tripping-plate secured to the frame, as indicated by the dotted lines in Fig. 19, against which the lever $b^{19}$ strikes at the end of the forward sliding movement of the tubular shaft C, the clutch mechanism that holds the portion $b^3$ in engagement with the said shaft, as indicated in Fig. 19, is disengaged from said shaft.

Upon the release of the portion $b^3$ a spring acts to throw the same toward the standard $b^4$ backward away from the socket and the plier-head $b^5$, carrying with it all of the parts attached thereto, including the leader or plate $b^6$ and the guiding-tubes $b$, attached thereto, thus leaving the overdrawn wires $w^2$ $w^3$ extending diametrically beneath the socket and across the opening between the perforated jaw of the pliers, as indicated in Fig. 8. This last operation restores the machine to that position in which it is ready to receive a second bottle to be wired, and the operations hereinbefore described are repeated.

That portion of the machine which embodies other features of my invention is illustrated more in detail in Figs. 18, 19, and 20 on Sheet 8 of the drawings, in which are shown the devices for stretching and holding the overdrawn wires $w^2$ $w^3$ during and immediately preceding the twisting operation, and also for depressing the said wires close to the neck of the bottle.

To more fully understand the tension or clamping device, I will briefly describe the mechanism with which the same is used and upon which the operation of said device in some measure depends.

To the end of the tubular shaft or spindle C is rigidly attached the plier-head $b^5$, to which the pliers are pivoted, as shown in Fig. 8, and projecting from said head are two perforated portions, $b^7$ $b^8$, through which the rods $b^9$ and $b^{10}$ move, the former of said rods, $b^9$, being secured to the portion $b^3$ and projecting forward through the portion $b^7$ toward the socket, and the latter, $b^{10}$, forming a part of the leader $b^6$, and projecting backward through the portion $b^8$, away from the socket, into the portion $b^3$. Around said rod $b^9$, between the portions $b^3$ and $b^7$, is arranged a spring, $b^{11}$, and arranged within said rod is a spring, $b^{12}$, and plunger $b^{13}$. Near the end of the rod $b^{10}$ is a pin, $b^{14}$, and a slot, $b^{15}$, through which extends a fixed pin, $b^{16}$. The clutch mechanism of the portion $b^3$ consists of a locking-bar, $b^{17}$, which enters a recess, $b^{18}$, in the shaft at the proper time, a lever, $b^{19}$, and spring $b^{20}$ acting to throw said bar into locking engagement, as in Fig. 19. To the leader $b^6$ is pivoted an angular tension-plate, $b^{21}$, or clamping device, one part of which projects over a saddle, $b^{22}$, which is poised on the knife-edge $b^{23}$. The other portion of said tension-plate projects upward just in front of the plunger $b^{13}$, as indicated in Fig. 18. The overdrawn wires $w^2$ $w^3$ pass from the tubular shaft forward between the tension-plate and the poised saddle to and through the guiding-tubes $b$, so that any movement of said tension-plate down upon the saddle will grip and hold said wires immovably therebetween.

The operation of these various devices is as follows, to wit: In the initial operation of the machine the backward sliding movement of the tubular shaft carries all of the attached parts therewith, and when the jaws of the pliers have passed around and behind the neck of the bottle the sliding movement of the shaft has reached that point when the portion $b^3$ strikes the adjustable fixture $b^{24}$ in the standard of the machine and remains stationary, a pin, $b^{25}$, on the saddle separating the wires $w^2$ and $w^3$. The backward movement of the shaft, however, continues, the head $b^5$ sliding along the rods $b^9$ and $b^{10}$, and when the portion $b^8$ of the said head strikes the pin $b^{14}$ the leader $b^6$ is drawn back, carrying the tension-plate backward against the end of the plunger $b^{13}$, thereby pressing the lower portion of said tension-plate down upon the wires $w^2$ $w^3$ between the same and the saddle, as will be understood, and holding them immovably therebetween. At the end of this backward sliding motion, when the wires are thus held firmly by the tension-plate and between the jaws of the pliers, the twisting operation begins, caused by the rotation of the tubular shaft and the pliers, &c., attached thereto. The function of the plate $e$ is illustrated in Figs. 18 and 19, acting, as hereinbefore stated, to press the overdrawn wires $w^2$ $w^3$ down toward the neck of the bottle, the notches $e^5$ in the bottom of the said plate serving to prevent any side movement or slipping of said wires.

The mechanism for producing the rotary and reciprocatory motion of the tubular shaft is illustrated in the drawings, but not described herein, not being considered essential to an understanding of that portion of the machine which forms the subject of the invention.

By reference to Fig. 1 it will be seen that the four wire-holding spools D are arranged independent of the tubular shaft C, being removably arranged upon a bracket, D', secured to the frame of the machine and rotated by a system of gearing, D², driven from the main shaft. This arrangement of the spools and the mechanism for operating the same form no part of my invention and are hereby disclaimed, it being the intention of the inventor thereof to make a separate application for the same.

It will be understood that many variations of construction and arrangement of the various parts herein described may be made. For instance, instead of forming an abutment on the rocking frame to engage with the cutter, the said abutment may be operated and formed of an independent piece of mechanism, and also so with other portions of the mechanism; hence I do not wish to be limited to the exact form of mechanism shown and described.

Having thus described my invention, what I wish to claim is—

1. In a machine for wiring corks in bottles, the combination, with mechanism for drawing or placing the binding-wires over the top of the cork and around the neck of the bottle, twisting devices whereby the ends of said binding-wires are twisted into a single strand, and a cutting device operating to sever the binding-wires around the neck of the bottle from the continuous length of the binding-wires, of bending devices operating automatically to bend the projecting twisted ends of the severed binding-wires down close to the neck of the bottle, all of the operations of said drawing, twisting, cutting, and bending mechanism following consecutively without removing the bottle from the machine, for the purpose set forth.

2. In a machine for wiring corks in bottles, the combination, with a socket adapted to receive and hold the neck of a bottle, of bending-down devices constructed and arranged to press the projecting twisted ends of the binding-wires close to the neck of the bottle on opposite sides thereof, for the purposes set forth.

3. In a machine for wiring corks in bottles, the combination, with a socket adapted to receive the head of a bottle, of a bending-down lever, $h^6$, constructed and arranged to press the twisted ends of the binding-wires projecting from the side of the bottle opposite to the twisting and severing devices down close to the neck of said bottle, twisting and severing devices arranged on the side of said socket opposite to said bending-down lever, and means for operating said lever, for the purpose set forth.

4. In a machine for wiring corks in bottles, the combination of a socket adapted to receive the head of a bottle, a rocking frame pivotally arranged in relation to said socket, a bending-down lever, $h^6$, pivotally secured to said frame, and means for causing the engagement of said lever with the twisted ends of the binding-wires projecting from the side of the bottle opposite to the twisting and severing devices, for the purpose set forth.

5. In a machine for wiring corks in bottles, the combination of a socket adapted to receive the head of a bottle, a rocking frame having a portion, $h'$, on one side of said socket and pivotally arranged in relation thereto, a bending-down lever pivoted to said portion $h'$ of said frame, means for causing the engagement of said lever with one of the projecting twisted ends of the binding-wires, as set forth, and operating to permit the automatic accommodation of said lever to different-sized bottles, for the purpose set forth.

6. In a machine for wiring corks in bottles, the combination of a socket to receive the head of the bottle, a rocking frame having portions $h\ h'$ projecting downwardly on opposite sides of said socket and pivotally arranged in relation thereto, a bending-down lever pivotally attached to one of said portions, as $h'$, on one side of the socket and adapted to bend down one of the projecting twisted ends of the binding-wires, and a knife or cutter carrying frame pivotally arranged in relation to said socket and having a cutter thereon engaging with said portion $h$, for the purpose set forth.

7. In a machine for wiring corks in bottles, the combination of a socket adapted to receive the head of a bottle, a rocking frame having portions $h\ h'$ projecting downwardly on opposite sides of said socket, said frame being pivotally arranged in relation to the socket, a bending-down lever pivotally attached to one of said portions, as $h'$, on one side of the socket and adapted to bend down one of the projecting twisted ends of the binding-wires, a knife or cutter carrying frame pivotally arranged in relation to said socket and provided with a cutter secured thereto adapted to engage with the portion $h$ of the rocking frame, and mechanism constructed and arranged to cause and maintain the engagement of the bending-down lever with one side of the neck of the bottle while the cutter is severing the twisted strand on the opposite side of said neck, for the purpose set forth.

8. In a machine for wiring corks in bottles, the combination of a socket adapted to receive the neck of a bottle, a bending-down lever having a toothed end or jaw, $h^7$, and a tubular portion, $h^8$, provided with a spring-actuated and adjustable plunger projecting therefrom, and means constructed and arranged to cause the engagement of said plunger and socket and to thereby throw the toothed jaw around toward the interior of said socket, substantially as and for the purpose set forth.

9. In a machine for wiring corks in bottles, the combination of a socket adapted to receive the neck of a bottle, a bending-down lever having a toothed jaw, $h^7$, and a tubular portion, $h^8$, provided with a spring-actuated and adjustable plunger projecting therefrom, a rocking frame to which said lever is pivoted, and which is pivotally arranged in relation to said socket, a cam for operating said frame, and means for operating said cam, substantially as and for the purposes set forth.

10. In a machine for wiring corks in bottles, the combination, with the wire-cutting device, of means constructed and arranged to bend or press the twisted severed end of the binding-wires down close to the neck of the bottle after the severing thereof from the continuous length of the binding-wires, for the purpose set forth.

11. In a machine for wiring corks in bottles, the combination of a socket adapted to receive the neck of a bottle, a pivotally-arranged cutter placed adjacent to said socket, means for operating said cutter, and an abutment with which said cutter engages, and which, by said engagement, forces said cutter toward the bottle-socket and against the projecting twisted end of the severed binding-wires, for the purposes set forth.

12. In a machine for wiring corks in bottles, the combination of a swinging frame, I, having a spring-receiving chamber, $i^5$, a spring and bolt arranged in said chamber, a pivoted cutter-carrying piece provided with a slotted arm, $i^3$, engaging with said spring and bolt, and an arm having a curved side or edge, $i^8$, a cutter secured to said arm and having a curved extension, $i^{12}$, a cutting-edge, $i^{13}$, beneath said extension, and a projection, $i^{14}$, an abutment with which said cutter engages during the cutting and bending-down operations, and means for causing the movement of said frame and the engagement of said cutter and abutment, for the purposes set forth.

13. In a machine for wiring corks in bottles, a knife or cutter having a curved extension, $i^{12}$, a cutting-edge, $i^{13}$, and a projection, $i^{14}$, for the purposes set forth.

14. In a machine for wiring corks in bottles, the combination of a socket adapted to receive the neck of a bottle, a rocking frame pivotally arranged in relation to said socket, and having downwardly-projecting portions $h\ h'$ and an arm, $h^4$, said portion $h$ having a recess, $h^{12}$, therein, a bending-down lever pivoted to said portion $h'$ of the rocking frame and having a toothed jaw, $h^7$, and a tubular portion, $h^8$, provided with a spring-actuated plunger therein and operating as set forth, a cutter-carrying frame, I, pivotally arranged in relation to the bottle-socket, a knife pivotally secured to said frame I and engaging with the portion $h$ of the rocking frame, a double-acting cam having the portions $j\ j'$, which engage with and actuate said rocking and cutter-carrying frames, a rod, $g^3$, a spring, $g^5$, arranged around said rod, a pivoted connecting-rod, $j^3$, plate $g^2$, and a cam, $g'$, on the main shaft, substantially as and for the purposes set forth.

15. In a machine for wiring the corks in bottles, the combination, with a socket adapted to receive the head of a bottle, of a plate, $e$, provided with notches in the lower edge or side thereof, interposed between the head of the inserted bottle and the twisting mechanism, for the purpose set forth.

16. In a machine for wiring corks in bottles, a clamping device operating automatically and constructed and arranged to engage with and hold the separated unsevered overdrawn binding-wires $w^2\ w^3$ during the twisting operation, said clamping device being placed on that side of the bottle-holding socket from which the continuous binding-wires are fed, for the purposes set forth.

17. In a machine for wiring corks in bottles, the combination of a clamping device or plate under which the overdrawn wires $w^2\ w^3$ pass, placed on that side of the bottle-holding socket from which the said binding-wires are fed, and means constructed and arranged to cause the holding engagement of said plate upon said wires during the twisting operation, for the purposes set forth.

18. In a machine for wiring corks in bottles, the combination of a sliding tubular shaft, C, a perforated head, $b^5$, rigidly secured to said shaft, a leader, $b^6$, having a knife-edge, $b^{23}$, thereon, a rod, $b^{10}$, projecting backward through said head $b^5$ and having a stop, $b^{14}$, a sliding portion, $b^3$, provided with clutch mechanism, and a rod, $b^9$, projecting therefrom through the head $b^5$, having a spring, $b^{11}$, therearound between said head and portion $b^3$, and a spring-actuated plunger, $b^{13}$, therein, an angular tension-plate, $b^{21}$, arranged adjacent to said spring-actuated plunger $b^{13}$ and resting upon a pivoted saddle, $b^{22}$, and said pivoted saddle $b^{22}$, all said parts being arranged and operating substantially as and for the purpose set forth.

19. In a machine for wiring corks in bottles, the combination of a bottle-holding socket, a bending-down device arranged on one side of said socket, a combined cutter and bending-down device arranged on the opposite side of said socket, and mechanism constructed and arranged to cause said bending-down device to engage and press down the twisted end of the binding-wires on one side of the bottle, and to maintain said engagement while the twisted wire is being severed and bent down on the opposite side of said bottle, and to cause said combined cutter and bending-down device to sever the twisted wires and bend down the projecting ends, for the purposes set forth.

20. In a bottle-wiring machine, the combination, with the gripping-pliers constructed and arranged to seize and hold the severed twisted ends of the continuous binding-wires, and mechanism constructed and arranged to cause said pliers to seize and release said twisted ends, of a bending-down device constructed and arranged to engage with said twisted ends upon the release thereof by the nippers, for the purposes set forth, and mechanism whereby said bending-down device is caused to engage with said twisted ends.

21. In a bottle-wiring machine, a bending-down lever, $h^6$, provided with a serrated or toothed end, $h^7$, having a projecting flange, $h^{13}$, for the purposes set forth.

22. In a bottle-wiring machine, the combination of a socket to receive and hold the head or neck of a bottle, a rocking frame pivotally secured to said socket and provided with an arm, $h^3$, a cutter-carrying frame pivotally secured to said socket, a double-acting cam engaging with said arm $h^3$ and said cutter-carrying frame, and springs $i^{11}$, connecting said rocking and cutter-carrying frames, and operating to hold the frames in engagement with said cam and to return said frames to their normal position upon the release of said cam, for the purposes set forth.

In testimony that I claim the invention set forth above I have hereunto set my hand this 16th day of December, 1886.

BENJ. ADRIANCE.

Witnesses:
  WM. H. LLOYD,
  JOHN O'CONNELL.